United States Patent Office 3,231,969
Patented Feb. 1, 1966

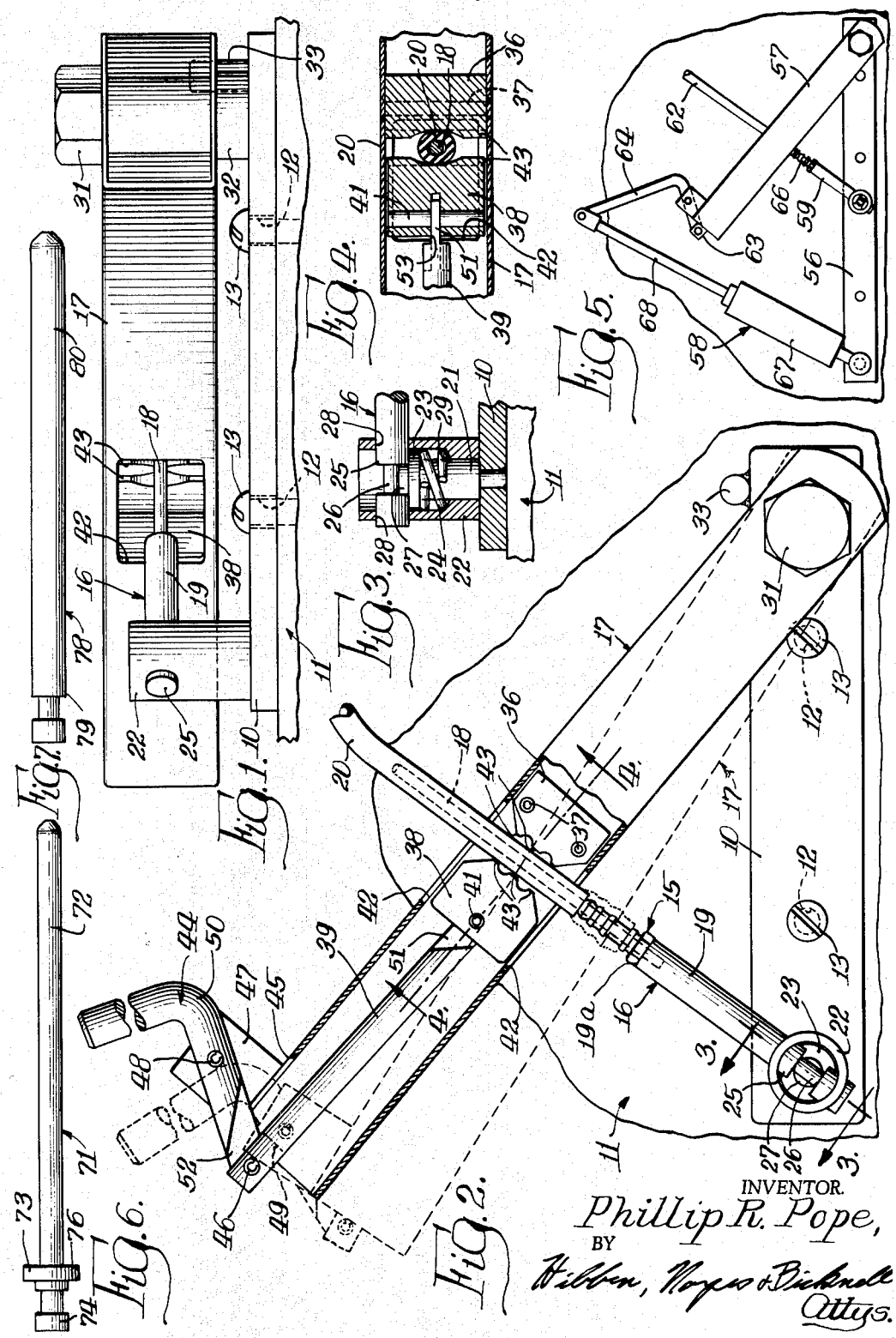

3,231,969
APPARATUS FOR ASSEMBLING HOSE AND
FITTING
Phillip R. Pope, Burleson, Tex., assignor to Stratoflex,
Inc., Fort Worth, Tex., a corporation of Texas
Filed July 29, 1963, Ser. No. 298,006
16 Claims. (Cl. 29—237)

This invention relates to an apparatus for assembling a fitting and a flexible hose.

A fitting is frequently assembled to hose by pushing the hose into or onto the fitting. Once the fitting and hose have been placed in assembled relation, numerous means are available for retaining them in assembled relation. One assembly of this type includes what is known in the trade as a push-on type of fitting, which is one where an end of a hose encases or telescopes over a portion of the fitting and is retained thereon only by friction. Gripping means, such as teeth or annular ribs, may be formed on the outer periphery of the inserted portion of the fitting to increase the friction holding the fitting and the hose in assembled relation.

It is a primary object of this invention to provide novel apparatus for assembling a hose and a fitting, wherein the apparatus is designed to grip the hose and force the hose into assembled relation with the fitting by a single movement or operation.

It is another object to provide apparatus of the foregoing character, which may be temporarily held in operative position as in a vise or permanently mounted, for example, on a bench.

Still another object is to provide apparatus of the foregoing character, which may be easily adjusted to assemble hose and fitting of various sizes.

A still further object is to provide apparatus of the foregoing character, which may be either power or hand operated.

Other objects and advantages of the invention will become apparent from the following description taken in conjunction with the accompanying figures of the drawing, in which:

FIG. 1 is a side elevational view of apparatus embodying the invention;

FIG. 2 is a top view, partly in section, of the apparatus;

FIG. 3 is a sectional view taken on the line 3—3 of FIG. 2;

FIG. 4 is a sectional view taken on the line 4—4 of FIG. 2 but showing a portion of the apparatus in a different position;

FIG. 5 is a top elevational view on a reduced scale, showing an alternative construction of the apparatus;

FIG. 6 is an elevational view showing an alternative construction of a mandrel for the apparatus; and FIG. 7 is a view similar to FIG. 6 and showing still another alternative construction of the mandrel.

In general, apparatus embodying the invention is adapted to hold a fitting substantially stationary and, when the apparatus is actuated, to grip a hose and force the hose into assembled relation with the fitting in a single operation. The apparatus comprises a base in the form of a bar adapted to be held stationary, a mandrel fastened to the bar for supporting a fitting and for guiding the hose, and an arm fastened to the bar for supporting a hose gripping means. The mandrel and the arm are pivotally fastened to the base, and are positioned so that the hose gripping means moves along the mandrel, when the arm is swung to force the hose into assembled relation with the fitting. The apparatus further comprises a lever pivotally fastened to the arm for actuating the hose gripping means and for swinging the arm. After a fitting is positioned on the mandrel and a hose is positioned within the hose gripping means, the lever is swung in one direction. Initial movement of the lever causes the hose to be tightly gripped by the gripping means, and continued movement of the lever then causes the arm and the hose to swing toward the fitting, and the hose and the fitting to be brought into assembled relation.

In greater detail, an apparatus embodying the invention is shown in FIGS. 1 and 2, and comprises a base in the form of a bar 10, which may be secured to a stationary bench indicated generally by the numeral 11. A plurality of holes 12 are formed in the bar 10 through which bolts 13 may be passed in order to secure the bar 10 to the bench 11. Alternatively, the bar 10 may be held stationary simply by securing it in a conventional vise. A mandrel 16 for supporting a fitting 15 is pivotally mounted adjacent one end of the bar 10, and an arm 17, which has mounted thereon means for gripping a hose 20, is pivotally mounted adjacent the other end of the bar 10.

The mandrel 16 is preferably in the form of a round rod and includes a forward portion 18, an intermediate portion 19, and a rearward portion 25. The forward portion 18 is sized to receive the fitting 15 thereon and it is sized to extend into the hose 20. The intermediate portion 19 has a larger diameter than the forward portion 18 and forms a shoulder 19a at the juncture of the two portions 18 and 19, the fitting 15 being positioned with one end abutting the shoulder 19a. The mandrel 16 is preferably mounted on the bar 10 for pivotal movement on an axis normal to the bar 10 by means comprising a concentrically mounted post 21 and sleeve 22 (FIG. 3). The post 21 is circular in cross section and is secured at its lower end to the bar 10 as by welding. The post 21 has an enlarged portion 23 adjacent its upper end, and the sleeve 22 is counterbored to receive the enlarged portion 23 of the post and form a ledge 29 between the portion 23 and the base 10, so that the sleeve 22 cannot be lifted off the post 21 once the sleeve 22 and the post 21 have been assembled and the post 21 has been secured to the bar 10. A coiled compression spring 24 is positioned between the portion 23 and the ledge 29 and urges the sleeve 22 toward the base 10.

The mandrel 16 is adapted to be mounted in the sleeve 22 and is secured against endwise movement therein. For this purpose the sleeve 22 has diametrically opposite openings 28 in the sides thereof and the rearward portion 25 of the mandrel 16 extends through the openings 28. The rearward portion 25 of the mandrel 16 includes a reduced diameter area, indicated by the numeral 26, which receives a projection 27 formed on the upper end of post 21. The projection 27 is preferably circular in cross section as shown in FIG. 2 so that the mandrel 16 may be pivoted about the axis of the post 21. The compression spring 24 normally holds the sleeve 22 and the mandrel 16 in a downward position relative to the post 21 and the projection 27 thus extends into the reduced diameter area 26 of the mandrel and prevents movement of the mandrel along its axis. Because the reduced diameter area 26 is circular, the mandrel 16 does not need to be rotated about its axis to a particular relative position to properly engage with the projection 27. To remove the mandrel 16, the sleeve 22 is moved upwardly against the force of the spring 24 until the projection 27 is no longer within the reduced diameter area 26 of the mandrel at which point the rearward portion 25 of the mandrel may be moved longitudinally out of the openings 28 of the sleeve 22. The mandrel 16 may be assembled on the apparatus by the reverse process. Mandrels in a variety of sizes may be provided to suit fittings and hose of different sizes by varying the diameter and length of the forward and intermediate portions of the mandrels, but the size of the rearward portions of the mandrels should be the same in order to fit in the openings 28 of the sleeve 22.

The arm 17 is preferably a tubular substantially square member, and is pivotally mounted on the bar 10, by means comprising a bolt 31 and an annular spacer or washer 32. The bolt 31 fits loosely within holes formed in the upper and lower sides of the arm 17, and the head of the bolt is positioned over the upperside of the arm 17 while the lower end of the bolt 31 is secured to the bar 10 as by welding. The spacer 32 is positioned between the bar 10 and the lower side of the arm 17 and maintains the arm 17 spaced above the bar 10. A stop pin 33 may be secured as by welding to the base 10 adjacent the arm 17, and is positioned to engage the arm 17 and prevent excessive pivotal movement of the arm 17 in either direction of movement of the arm 17.

As previously stated, the arm 17 has mounted thereon means for gripping the hose 20. In the present instance, this means comprises a stationary holding block secured within the arm 17 as by two pins 37, and a movable holding block 38 slidably mounted within the arm 17. To move the holding block 38, one end of a link 39 is pivotally connected thereto by a pin 41, the link 39 extending through the arm 17 and to the free end thereof. The end of the link 39 connected to the block 38 is reduced in thickness as at 51 and extends into a slot 53 (FIG. 4) in the block 38. The holding blocks 36 and 38 are positioned within the tubular arm 17 in spaced relation to each other and adjacent openings 42 formed in the two vertical sides of the arm 17. As shown in FIG. 3, the openings 42 are located so that the mandrel 16 may extend through them and between the blocks 36 and 38 and be substantially normal to the axis of the arm 17. To obtain a good grip on the hose 20, the opposing faces of the blocks 36 and 38 are provided with vertically extending ribs 43, and, as shown in FIGS. 1 and 4, the ribbed faces of the blocks are curved inwardly so that they may approximately conform to the curvature of the hose 20.

The block 38 is movable along the axis of the arm 17 toward and away from the stationary block 36 in order to grip and release the hose 20. To impart this motion to the block 38, the end of the link 39 projecting to the free end of the arm 17 is pivotally connected to one end of a lever 44 by a pin 46, this end of the lever 44 being reduced in thickness as at 52 and extending into a slot 49 in the link 39. From the link 39, the lever 44 extends through an opening 45 (FIG. 2) in the side of the arm 17 and between two spaced apart lugs 47 which are secured to the outside of the arm 17 adjacent the opening 45. The lever 44 is pivotally fastened to the lugs 47 by means of a pin 48. Beyond the pin 48, the lever 44 is bent as at 50 such that it forms substantially a right angle. By this construction, the link 39 and the block 38 move toward the block 36 when the lever 44 is swung counterclockwise.

As previously stated, a different mandrel is preferably provided for each size of fitting and hose to be assembled. The forward portion 18 of a mandrel for a particular size fitting receives the fitting which is positioned against the shoulder 19a, and the hose 20 is slipped over the forward portion 18 of the mandrel. The fitting 15 shown in the drawings is a push-on type which receives the end of the hose 20 over a portion of it, the hose and the fitting being held in assembled relation only by friction. The forward portion 18 of the mandrel guides the end of the hose 20 onto the fitting, and the mandrel is preferably sufficiently long that it always extends between the blocks 36 and 38, to prevent collapse of the hose by the gripping means, even at the limit of pivotal movement of the arm 17 in the clockwise direction as shown in FIG. 2.

With a mandrel 16 of the proper size for the fitting 15 and the hose 20, the lever 44 is swung clockwise to the full line position shown in FIG. 2. This causes the block 38 to simultaneously move away from the block 36. The fitting 15 is then slipped over the forward portion 18 of the mandrel 16 and brought up to the shoulder 19a.

The end of the hose 20 is slipped over the forward portion 18 of the mandrel 16, passed through the openings 42 of the arm 17 and between the blocks 36 and 38, and brought up to the end of the fitting 15. The free end of the lever 44 is then pushed to cause the lever to rotate in the counterclockwise direction about the pin 48. The force on the lever 44 is normal to the axis of the portion beyond the bend 50 in the lever, which axis is initially at a substantial angle with the axis of the arm 17, so that the force on the lever initially has little tendency to pivot the arm 17 about the bolt 31 but rather causes the block 38 to slide toward the stationary block 36 and engage the hose 20. The angle between the axis of the lever 44 and the arm 17 gradually decreases on movement of the lever and by the time the block 38 contacts the hose 20, the axis of the lever beyond the bend is moved to a small angle relative to the axis of the arm 17, so that maximum force is imposed on the blocks 36 and 38 and so that the force on the lever then swings the arm 17 and moves the hose onto the fitting. The dashed lines in FIG. 2 show the apparatus and the hose in the last phase of assembling the fitting and the hose. At this point, the arm 17 is perpendicular to the mandrel and all the ribs 43 grip the hose equally so as to give the maximum gripping actions.

Usually the hose may be gripped and forced onto the fitting in one movement of the lever 44 toward the fitting 15. In the event, this movement should be insufficient to complete the movement of the hose onto the fitting or in the event the blocks 36 and 38 should slip on the hose, the hose 20 may be moved only part of the required distance over the fitting 15. The lever 44 may then be swung away from the fitting 15 to approximately the solid line position shown in FIG. 2 and a fresh grip taken on the hose 20 and the latter moved fully onto the fitting.

In FIG. 5 is illustrated a similar apparatus which is power operated rather than hand operated. This apparatus comprises a bar 56 which again may be secured to a work bench or held in a vise as desired. An arm 57 is pivotally connected to one end of the bar 56, a power unit is pivotally connected to the other end of the bar 56, and a mandrel 59 is pivotally connected to the bar 56 intermediate the connections with the arm 57 and the power unit 58. The construction of the arm 57, the mandrel 59, and their pivotal mountings may be the same as those shown in FIGS. 1 to 4. Means for gripping a hose 62 including a pair of holding blocks (not shown) which may be identical to those shown in FIG. 2 and a link 63 are also mounted on the arm 57.

A lever 64, which is generally similar to the lever 44, is pivotally mounted on the arm 57 and has one end pivotally connected to the outer end of the link 63, so as to actuate the hose gripping means when the other end of the lever 64 is moved toward a fitting 66 mounted on the mandrel 59 as previously explained. The power unit 58 is connected to move the free end of the lever 64 toward and away from the fitting 66, and, in the embodiment shown, a fluid pressure power unit comprising a cylinder 67 and a piston rod 68 is provided. The rod 68 has one end pivotally connected to the free end of the lever 64, and the other end of the rod 68 is connected to a piston (not shown) inside the cylinder 67.

To assemble the hose 62 and the fitting 66 after they have been properly positioned on the apparatus, fluid under pressure is introduced into a cylinder 67 in a direction to draw the rod 68 into the cylinder 67 and pull the lever 64 toward the fitting 66. This action causes the hose 62 to be gripped and forced onto the fitting 66 as previously explained. After assembly, the power unit 58 is actuated to cause the rod 68 to be forced out of the cylinder 67, which causes the apparatus to release the hose 62. The hose 62 and the fitting 66 may then be slid off the mandrel 59.

FIGS. 6 and 7 illustrate two other types of mandrels which may be used in place of the mandrel 16. The mandrel 71 shown in FIG. 6 may be used with a fitting having a greater length and diameter than the fitting 15, and comprises a relatively long forward portion 72, an enlarged intermediate portion 73, and a rearward portion 74. The rearward portion 74 is preferably identical to the rearward portion 75 of the mandrel 16. The enlarged intermediate portion 73 of the mandrel 71 has a relatively short axial length and forms a shoulder 76 at its juncture with the forward portion 72. A fitting is again slid along the forward portion 72 and brought into abutting relation with the shoulder 76, and a hose to be assembled with the fitting is positioned over the forward portion 72 and forced on the fitting as previously explained. The axial length of the intermediate section 73 is made relatively short so that the end of the fitting adjacent the arm 17 will be at the desired position relative to the arm 17 when a hose is being assembled with the fitting.

In FIG. 7, a mandrel 78 is shown which is designed for use with a still larger size hose and fitting. The mandrel 78 comprises a rearward portion 79 and a forward portion 80, the intermediate portions present in the other mandrels being eliminated. The rearward portion 79 is preferably identical to the rearward portions 25 and 74 of the mandrels 16 and 71. Since the mandrel 78 does not have an intermediate portion forming a shoulder adapted to hold a fitting as is the case with the other two mandrels, a fitting positioned over the mandrel 78 may be slid all the way back to the rearward portion 79, where it will be restrained against further rearward movement by the sleeve 22. Thus a fitting on the mandrel 78 will abut the sleeve 22 while a hose is being assembled on it.

The apparatus described has numerous advantages. It may be permanently mounted on a work bench in a shop for example, or it may be taken into the field and used at the site of a project such as an oil well drilling operation. Further, a hose and a fitting are easily assembled in a single operation, and the apparatus may be quickly adjusted to assemble fittings and hose of various sizes, the only adjustment required being a substitution of one mandrel for another.

I claim:

1. Apparatus for assembling a flexible hose and a fitting, comprising a base, a mandrel for supporting a fitting and fastened to said base, an arm pivotally connected to said base, hose gripping means mounted on said arm and positioned to move along said mandrel on swinging movement of said arm, and a lever pivotally fastened to said arm and connected to actuate said hose gripping means and to swing said arm, said lever on initial movement thereof being adapted to shift said hose gripping means into gripping relation with the hose and thereafter to move the hose toward the fitting and into assembled relation with the fitting.

2. Apparatus as in claim 1, wherein said mandrel is also pivotally connected to said base, and said mandrel and said arm pivot on parallel axes.

3. Apparatus as in claim 1, wherein the axis of the portion of said lever to which the force is applied is positioned at a substantial angle with the axis of said arm during said initial movement, said angle gradually decreasing to a relatively small angle when said hose gripping means grips the hose, whereby the effect of the force on said lever is to first actuate said hose gripping means to grip the hose and thereafter the effect of the force is to maintain the gripping force at a maximum and to swing the arm.

4. Apparatus as in claim 1, wherein said hose gripping means comprises a block fixed to said arm and a movable block slidably mounted on said arm for movement toward and away from said fixed block, said lever being connected to said movable block such that said movable block moves toward and away from said fixed block upon pivotal movement of said lever.

5. Apparatus as in claim 4, wherein said hose gripping means further comprises a link connecting said movable block to said lever and extending generally longitudinally of said arm.

6. Apparatus as in claim 1, wherein said mandrel is removably fastened to said base and said mandrel is sized to receive and support a fitting of a predetermined size, said mandrel being removable so that another mandrel for a different size fitting may be substituted.

7. Apparatus as in claim 1, wherein means is provided for pivotally fastening said mandrel to said base, said means comprising a post secured to said base, a sleeve positioned around said post, means interposed between said post and said sleeve for biasing said sleeve toward said base, said sleeve having an opening formed transversely therethrough adapted to receive said mandrel, said post having a portion adapted to engage said mandrel when said mandrel is positioned within said opening said sleeve and said sleeve is biased toward said base, and said post and said mandrel being disengageable when said sleeve is moved away from said base.

8. Apparatus as in claim 7, wherein said mandrel has a reduced diameter portion and said post has a projection adapted to extend into said reduced diameter portion of said mandrel when said sleeve is biased toward said base.

9. Apparatus as in claim 1, wherein said mandrel includes an enlarged portion adjacent one end and a reduced portion extending to its other end, said reduced portion being adapted to have a fitting and a hose of predetermined size positioned thereon, and said enlarged portion being adapted to abut an end of the fitting.

10. Apparatus as in claim 1, and further including a stop member secured to said base for limiting swinging movement of said arm.

11. Apparatus for assembling a flexible hose and a fitting, comprising a base, a mandrel for supporting a fitting fastened to said base, a tubular arm pivotally connected to said base and having an opening formed transversely therethrough, said mandrel extending through said opening, a stationary block secured within said arm adjacent one side of said opening and a movable block slidably mounted within said arm adjacent the other side of said opening, said stationary block being on the side of said opening toward the pivotal connection of said arm to said base and said movable arm being on the side of said opening toward the free end of said arm, and a lever pivotally connected to said arm adjacent said free end and connected to said movable block, said lever on initial movement thereof being adapted to shift said movable block toward said stationary block and into gripping relation with a hose extending through said opening and on subsequent movement thereof to swing said arm and the hose toward the fitting and force the hose into assembled relation with the fitting.

12. Apparatus as in claim 11, wherein the faces of said blocks which grip the hose are provided with ribs and are curved inwardly to generally conform to the curvature of the hose.

13. Apparatus as in claim 11, wherein the faces of said blocks which grip the hose are provided with ribs, and said arm extends substantially perpendicular to said mandrel when said fitting and said hose are substantially completely assembled, whereby said ribs will have a maximum gripping action on said hose at such time.

14. Apparatus as in claim 11, and further including a link connecting said movable block to said lever, said link extending through said arm from said movable block to substantially said free end of said arm and being pivotally connected to said lever.

15. Apparatus as in claim 14, wherein said arm has an opening in its side at the free end thereof and a pair of spaced lugs secured to the outside of said housing on opposite sides of said opening, said lever extending between said lugs and being pivotally connected to said lugs.

16. Apparatus as in claim 15, wherein said lever is bent substantially at a right angle intermediate its free end and its pivotal connection to said lugs, said lever extending from said bend generally away from the free end of said arm.

References Cited by the Examiner

UNITED STATES PATENTS

| | | | |
|---|---|---|---|
| 331,147 | 11/1885 | Mallinckrodt | 29—237 |
| 1,927,688 | 9/1933 | McKee | 29—237 |

WILLIAM FELDMAN, *Primary Examiner.*